(12) United States Patent
Ohashi

(10) Patent No.: US 12,099,964 B2
(45) Date of Patent: Sep. 24, 2024

(54) QUALITY CONTROL DEVICE, QUALITY CONTROL SYSTEM, QUALITY CONTROL METHOD, AND QUALITY CONTROL PROGRAM

(71) Applicant: Mitsubishi Electric Corporation, Tokyo (JP)

(72) Inventor: Hiroshi Ohashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/288,294

(22) PCT Filed: Sep. 19, 2019

(86) PCT No.: PCT/JP2019/036754
§ 371 (c)(1),
(2) Date: Apr. 23, 2021

(87) PCT Pub. No.: WO2020/137037
PCT Pub. Date: Jul. 2, 2020

(65) Prior Publication Data
US 2021/0383313 A1    Dec. 9, 2021

(30) Foreign Application Priority Data
Dec. 28, 2018    (JP) .................................. 2018-247384

(51) Int. Cl.
*G01M 17/00*    (2006.01)
*G06Q 10/00*    (2023.01)
(Continued)

(52) U.S. Cl.
CPC ....... *G06Q 10/087* (2013.01); *G06Q 10/0838* (2013.01)

(58) Field of Classification Search
CPC .......................... G06Q 10/087; G06Q 10/0838
See application file for complete search history.

(56) References Cited

U.S. PATENT DOCUMENTS

| | | | |
|---|---|---|---|
| 8,266,171 B2 * | 9/2012 | Pirtle | G06Q 10/06 707/769 |
| 2002/0060150 A1 * | 5/2002 | Hashimoto | G01N 33/007 205/784.5 |

(Continued)

FOREIGN PATENT DOCUMENTS

| | | |
|---|---|---|
| JP | H09330309 A | 12/1997 |
| JP | 2001338089 A | 12/2001 |
| JP | 2013182498 A | 9/2013 |

OTHER PUBLICATIONS

International Search Report (PCT/ISA/210) with translation and Written Opinion (PCT/ISA/237) mailed on Dec. 10, 2019, by the Japan Patent Office as the International Searching Authority for International Application No. PCT/JP2019/036754.

*Primary Examiner* — Talia F Crawley
(74) *Attorney, Agent, or Firm* — Buchanan Ingersoll & Rooney PC

(57) ABSTRACT

An actual supply data acquirer acquires, for a replaceable member with which a product is replaceably provided, actual supply data representing an actual result of shipment for replacement of the replaceable member in the product that is already sold and used. A determiner, using the actual supply data acquired by the actual supply data acquirer, determines whether an excess demand situation occurs in which demand for the replaceable member exceeds predetermined forecasted demand. A notification controller, when the determiner determines that the excess demand situation occurs, performs notification control to cause sending of notification indicating a possibility that an abnormality is occurring in quality of the product.

6 Claims, 10 Drawing Sheets

(51) Int. Cl.
    *G06Q 10/083*     (2023.01)
    *G06Q 10/087*     (2023.01)
    *G06Q 99/00*     (2006.01)

(56) References Cited

U.S. PATENT DOCUMENTS

| | | | | |
|---|---|---|---|---|
| 2004/0088601 | A1* | 5/2004 | Shah | G05B 23/0224 |
| | | | | 714/E11.144 |
| 2007/0074149 | A1* | 3/2007 | Ognev | G06F 11/366 |
| | | | | 717/126 |
| 2009/0070273 | A1* | 3/2009 | Moryto | G06Q 40/12 |
| | | | | 705/37 |
| 2009/0216584 | A1* | 8/2009 | Fountain | G06Q 10/087 |
| | | | | 705/7.29 |
| 2010/0274629 | A1* | 10/2010 | Walker | G06Q 10/087 |
| | | | | 705/308 |
| 2010/0318553 | A1* | 12/2010 | Pirtle | G06Q 10/06 |
| | | | | 707/769 |
| 2012/0054076 | A1* | 3/2012 | Wu | G06Q 10/087 |
| | | | | 705/28 |
| 2016/0321125 | A1* | 11/2016 | Kang | G06F 11/079 |
| 2016/0321606 | A1* | 11/2016 | Kapil | G06Q 30/0633 |
| 2019/0250206 | A1* | 8/2019 | Noguchi | G06F 16/9035 |

* cited by examiner

FIG. 3

| REPLACEABLE MEMBER ID (322a) | SHIPPING DATE (322b) | ACTUAL QUANTITY (322c) | PRODUCT ID (322d) | FACTORY ID (322e) |
|---|---|---|---|---|
| aaa | ⋮ | ⋮ | AAA | jp03 |
| bbb | ⋮ | ⋮ | BBB | us01 |
| ⋮ | ⋮ | ⋮ | ⋮ | ⋮ |

| REPLACEABLE MEMBER ID | REFERENCE SUPPLY INDEX | |
|---|---|---|
| | IN CASE WHERE CUMULATIVE VALUE OF SHIPMENT QUANTITIES OF PRODUCT IS LESS THAN 1,000 | IN CASE WHERE CUMULATIVE VALUE OF SHIPMENT QUANTITIES OF PRODUCT IS MORE THAN OR EQUAL TO 1,000 |
| abc | 10 [COUNT] | 0.5 [%] |
| ⋮ | ⋮ | ⋮ |

FIG. 8

| REPLACEABLE MEMBER ID (322a) | PRODUCT ID (322f) | SHIPPING DATE (322b) | ACTUAL QUANTITY (322c) | FACTORY ID (322e) |
|---|---|---|---|---|
| abc | xxxx | ⋮ | ⋮ | jp01 |
| | yyyy | ⋮ | ⋮ | |
| | zzzz | ⋮ | ⋮ | |
| ⋮ | ⋮ | ⋮ | ⋮ | ⋮ |

| REPLACEABLE MEMBER ID (322a) | PRODUCT ID (322f) | SHIPPING DATE (322b) | ACTUAL QUANTITY (322c) | FACTORY ID (322e) |
|---|---|---|---|---|
| abc | xxxx<br><br>yyyy<br><br>zzzz | ⋮ | ⋮ | jp01 |
| ⋮ | ⋮ | ⋮ | ⋮ | ⋮ |

QUALITY CONTROL DEVICE, QUALITY CONTROL SYSTEM, QUALITY CONTROL METHOD, AND QUALITY CONTROL PROGRAM

TECHNICAL FIELD

The present disclosure relates to a quality control device, a quality control system, a quality control method, and a quality control program.

BACKGROUND ART

As disclosed in Patent Literature 1, a system is known that accepts a repair request for a product and trouble information indicating a symptom of trouble in the product that is inputted by a user and manages the inputted trouble information by associating the trouble information with identification information for identification of the product. Patent Literature 1 discloses that the trouble information accumulated in this system can be useful for improvement in quality of the same product.

CITATION LIST

Patent Literature

Patent Literature 1: Unexamined Japanese Patent Application Publication No. 2001-338089

SUMMARY OF INVENTION

Technical Problem

The technique disclosed in Patent Literature 1 needs, in order to determine whether the quality of the product is to be improved, checking content of each unit of trouble information accumulated in the above-described system and investigating whether the symptoms of trouble that are reported are inherently due to the quality of the product.

Since such check and investigation are time-consuming, the start of improvement in the case where the quality of the product is to be improved tends to be delayed. Thus, there is a need for a technique that enables earlier grasping of a possibility that an abnormality is occurring in the quality of the product and enables rapid start of improvement in the quality of the product.

Additionally, in the case where a product is provided with a replaceable member that is replaceable, the abnormality may possibly occur in quality of the replaceable member. Thus, there is also a need for a technique that enables grasping of a possibility that the abnormality is occurring in the quality of the replaceable member.

An objective of the present disclosure is to provide a quality control device, a quality control system, a quality control method, and a quality control program that enable, in comparison to conventional techniques, earlier grasping of the possibility that an abnormality is occurring in the quality of the product or the quality of the replaceable member with which the product is provided.

Solution to Problem

In a quality control device according to the present disclosure, actual supply data acquisition means acquires, for a replaceable member with which a product is replaceably provided, actual supply data representing an actual result of shipment, sales, or orders for replacement of the replaceable member in the product that is already sold and used. Determination means determines, using the actual supply data acquired by the actual supply data acquisition means, whether an excess demand situation occurs in which demand for the replaceable member exceeds predetermined forecasted demand or whether an indication leading to the excess demand situation occurs. Notification control means, when the determination means determines that the excess demand situation occurs or that the indication leading to the excess demand situation occurs, performs notification control to cause sending of notification indicating a possibility that an abnormality is occurring in quality of the product or the replaceable member.

Advantageous Effects of Invention

When an abnormality is occurring in quality of a product, a replaceable member with which the product is provided often fails to exhibit inherent durability, and life of the replaceable member often decreases. Thus demand for the replaceable member in the market tends to increase. Further, when an abnormality is occurring in quality of the replaceable member itself, the demand for the replaceable member in the market also tends to increase due to short life of the replaceable member.

According to a quality control device according to the present disclosure, detection of a possibility that an abnormality is occurring in quality of a product or a replaceable member can be achieved upon determination by determination means that an excess demand situation or an indication leading to the excess demand situation occurs for the replaceable member. Since the conventionally-required checking of symptoms of a reported trouble can be omitted, in comparison to conventional techniques, earlier grasping of a possibility that an abnormality is occurring in the quality of the product or the replaceable member can be achieved by notification control by notification control means.

BRIEF DESCRIPTION OF DRAWINGS

FIG. 3 is a schematic diagram illustrating configuration of a management database according to Embodiment 1;

FIG. 6 is a schematic diagram illustrating configuration of threshold value data according to Embodiment 2;

FIG. 8 is a schematic diagram illustrating configuration of a management database according to Embodiment 3;

FIG. 10 is a schematic diagram illustrating configuration of a management database according to Embodiment 4.

DESCRIPTION OF EMBODIMENTS

Figure 1:
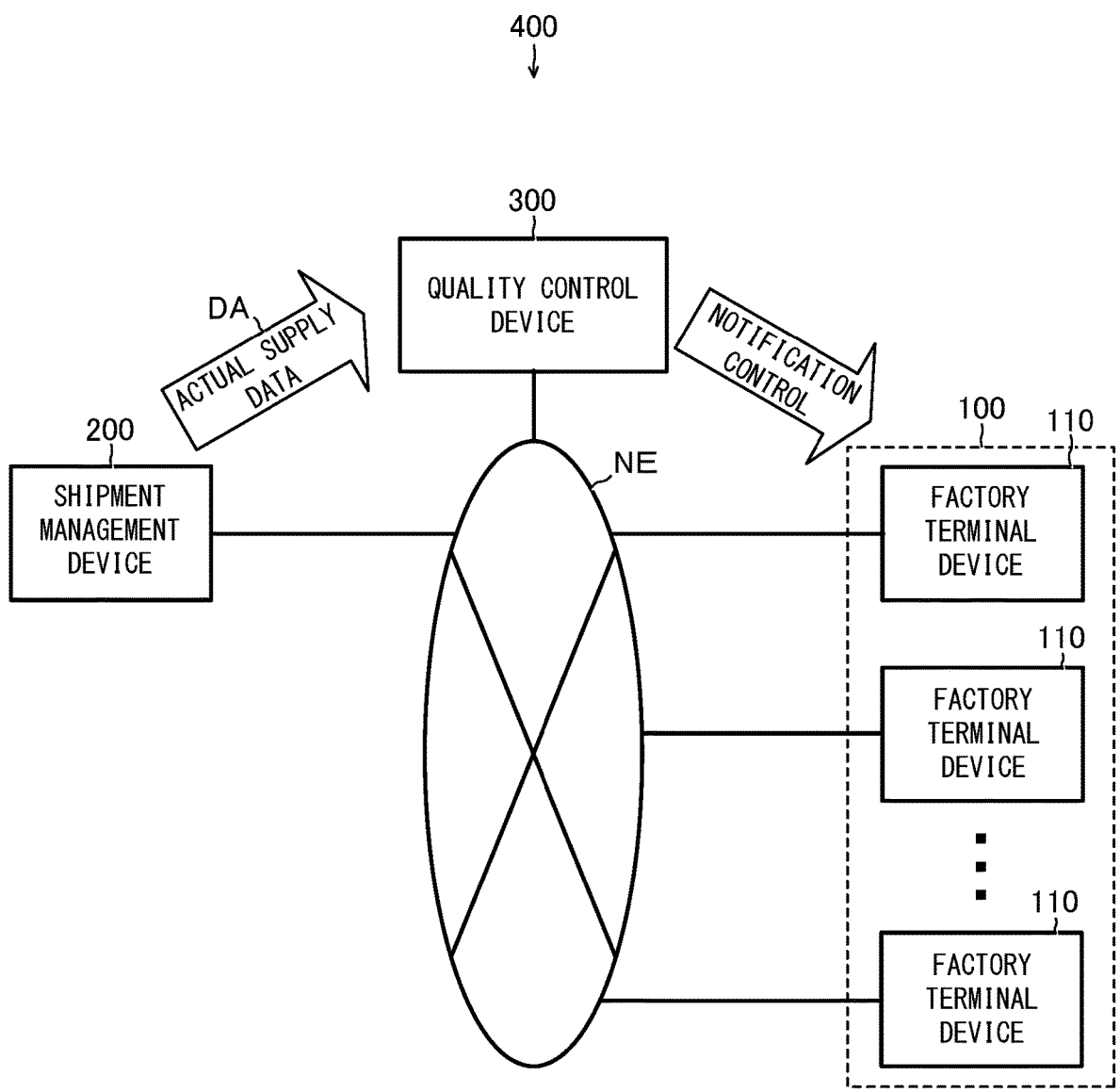
FIG. 1 is a schematic diagram illustrating configuration of a quality control system according to Embodiment 1.

Hereinafter Embodiments 1-5 of a quality control system according to the present disclosure are described with reference to the drawings. In the drawings, components that are the same or equivalent are assigned the same reference sign.

Embodiment 1

As illustrated in FIG. 1, a quality control system 400 according to the present embodiment includes a factory terminal device group 100 arranged in a manufacturing department of a company. The factory terminal device group 100 includes factory terminal devices 110 that each are arranged in a factory among factories constituting the manufacturing department. In each factory, a product and a replaceable member with which the product is replaceably provided are manufactured.

Further, the quality control system 400 includes a shipment management device 200 arranged in a shipment department to ship the product and a quality control device 300 arranged in a control department to control quality of the product. The factory terminal device group 100, the shipment management device 200, and the quality control device 300 are communicably connected via a communication line NE.

The shipment management device 200 manages an actual result of shipment of the product. Further, since the replaceable member is supplied to the market separately as a single item for replacement of the replaceable member in a product that is already sold and used, the shipment management device 200 also manages an actual result of shipment of the replaceable member as the single item.

The shipment management device 200 identifies each of multiple types of products in terms of product identification data (ID) and identifies each of multiple types of replaceable members in terms of a replaceable member ID.

In the present embodiment, the product IDs and the replaceable member IDs are taken to have one-to-one correspondence. That is to say, a replaceable member ID uniquely specifies a model of a product provided with a replaceable member represented by the replaceable member ID.

The shipment management device 200 is an example of an actual supply data provision device that transmits to the quality control device 300 actual supply data DA representing, for each of the multiple replaceable members with different types, an actual result of shipment of the replaceable member as a single item. The actual supply data DA is data that associates each of the replaceable member IDs and an actual quantity, of a replaceable member represented by the replaceable member ID, that is a quantity of the replaceable member shipped within a first period (specifically, within one day) that is a predetermined unit period for summing actual results.

The quality control device 300 acquires the actual supply data DA from the shipment management device 200 and determines, using the acquired actual supply data DA, for each of the multiple types of replaceable members having different replaceable member IDs, whether an excess demand situation occurs in which demand for the replaceable member exceeds predetermined forecasted demand.

Occurrence of the excess demand situation for a replaceable member indicates a possibility that an abnormality is occurring in the quality of the product provided with the replaceable member. This is because occurrence of the abnormality in the quality of the product causes the replaceable member with which the product is provided to fail to exhibit inherent durability and leads to decrease in the life of the replaceable member, resulting in an increase in the demand for the replaceable member in the market.

Thus, the quality control device 300, when determining that the excess demand situation occurs for a replaceable member, performs notification control for causing a factory terminal device 110 arranged in a factory for manufacturing a product provided with the replaceable member, referred to hereinafter as an "abnormality-suspected product" to send notification indicating a possibility that an abnormality is occurring in the quality of the abnormality-suspected product.

The factory terminal device 110 is an example of a notification device that sends, upon receiving the notification control by the quality control device 300, notification indicating a possibility that the abnormality is occurring in the quality of the abnormality-suspected product. This causes grasping in the factory of the possibility that an abnormality is occurring for the quality of the abnormality-suspected product, enabling a start of improvement in the quality of the abnormality-suspected product.

Since the quality control system 400 according to the present embodiment is most highly characterized by the functions of the quality control device 300 thereof that detects occurrence of the excess demand situation for a replaceable member, the quality control device 300 is hereinafter described in detail.

Figure 2:
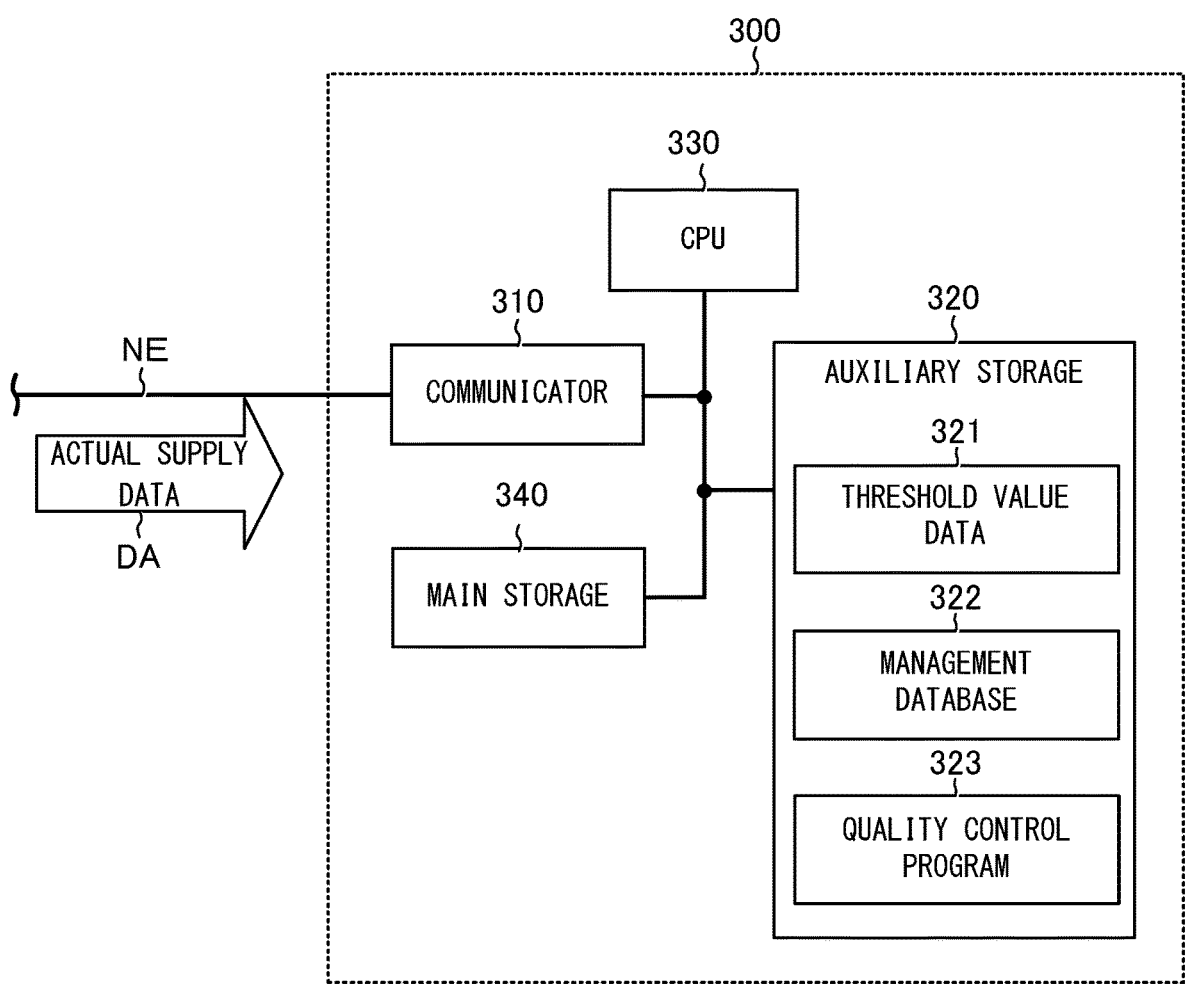
FIG. 2 is a schematic diagram illustrating configuration of a quality control device according to Embodiment 1.

As illustrated in FIG. 2, the quality control device 300 includes a communicator 310 connected to a communication line NE. The communicator 310 performs communication between the shipment management device 200 and the factory terminal device group 100 that are illustrated in FIG. 1. That is to say, the actual supply data DA described above is imported into the quality control device 300 via the communicator 310. Further, the quality control device 300 performs the notification control described above via the communicator 310.

The quality control device 300 further includes an auxiliary storage 320 that is an example of storage means for storing threshold value data 321 representing forecasted demand for each replaceable member. The threshold value data 321 is used as a reference for determination of whether the excess demand situation is occurring for the replaceable member.

The threshold value data 321 defines, for each replaceable member ID, a reference supply index representing a forecasted supply quantity of a replaceable member represented by the replaceable member ID. Specifically, the reference supply index represents a forecasted value for a shipment quantity of a replaceable member within a second period (specifically, within one month) that is determined to be longer than the above-described first period as a period for repetitive determination of whether the excessive demand situation is occurring for the replaceable member.

The auxiliary storage 320 is also an example of accumulation means for storing management database 322 in which the above-described actual quantities that are included in the actual supply data DA and represent an actual result of shipment of the replaceable members are accumulated. Hereinafter, the management database 322 is described with reference to FIG. 3.

As illustrated in FIG. 3, the management database 322 contains an item 322a for storing the replaceable member ID for identification of each of the multiple types of the replaceable members, an item 322b for storing a shipping date on which the replaceable member is shipped, and an item 322c for storing the above-described actual quantity for the replaceable member. Supplemental writing to the items 322b and 322c is performed in response to each acquisition of the actual supply data DA.

The management database 322 further contains an item 322d for storing a product ID of a product provided with a replaceable member represented by a replaceable member ID stored in the item 322a and an item 322e for storing a factory ID for identification of a factory for manufacturing the product and the replaceable member. In the present embodiment, factory IDs and the factory terminal devices 110 included in the factory terminal device group 100 illustrated in FIG. 1 are taken to have one-to-one correspondence.

Again with reference to FIG. 2, the auxiliary storage 320 also stores a quality control program 323 that specifies a process of determining for each replaceable member whether the excess demand situation occurs in which demand for the replaceable member exceeds the forecasted demand represented by the threshold value data 321.

The quality control device 300 includes a central processing unit (CPU) 330 that retrieves the quality control program 323 from the auxiliary storage 320 and executes the quality control program 323, and a main storage 340 in which the CPU 330 temporarily stores the quality control program 323 and various types of data.

Hereinafter, functions of the quality control device 300 that are achieved by execution of the quality control program 323 by the CPU 330 are described with reference to FIG. 4.

Figure 4:
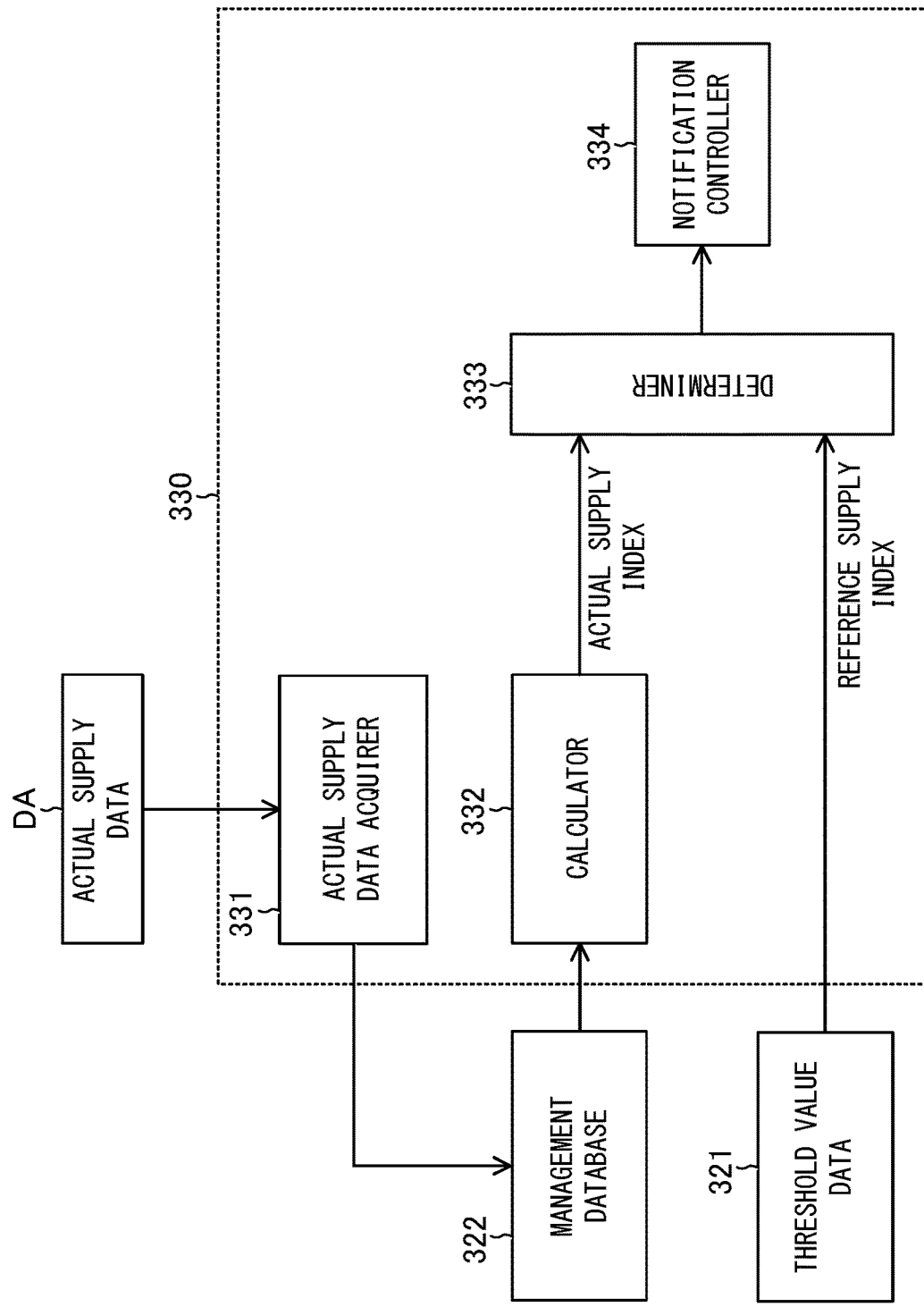
FIG. 4 is a schematic diagram illustrating functional configuration of the quality control device according to Embodiment 1.

As illustrated in FIG. 4, the CPU 330 functionally includes an actual supply data acquirer 331 that is an example of actual supply data acquisition means for acquiring the actual supply data DA. The actual supply data acquirer 331, at every first period described above (specifically, every day), acquires the actual supply data DA from the shipment management device 200 illustrated in FIG. 1 and performs, using the acquired actual supply data DA, supplemental writing to the items 322b and 322c in the management database 322 that are illustrated in FIG. 3.

The CPU 330 functionally includes a calculator 332 that is an example of calculation means for calculating an actual supply index representing an extent of supply of the replaceable members to the market. Specifically, the calculator 332 performs summation of totaling actual quantities accumulated in the management database 322 for the second period that is previously occurring (specifically, for one month). The actual quantities are accumulated in the item 322c of the management database 322 that is illustrated in FIG. 3. The value obtained by summing the actual quantities for one month is the actual supply index described above.

The CPU 330 functionally includes a determiner 333 that is an example of determination means for determining for each of multiple types of replaceable members whether the excess demand situation occurs in which demand for the replaceable member exceeds predetermined forecasted demand. Specifically, the determiner 333 compares (i) the actual supply index calculated by the calculator 332 and (ii) the reference supply index that is a forecasted value for a shipment quantity within one month represented by the threshold value data 321. The determiner 333, when the actual supply index exceeds the reference supply index, determines that the excess demand situation occurs.

The CPU 330 functionally includes a notification controller 334 that is an example of notification control means for, when the determiner 333 determines that the excess demand situation occurs, performing notification control to cause sending of notification indicating a possibility that an abnormality is occurring in quality of a product.

A product described above among the multiple types of products that is provided with a replaceable member for which a determination is made by the determiner 333 that the excess demand situation occurs is termed an "abnormality-suspected product". The notification controller 334 performs the notification control for a factory terminal device 110 included in the factory terminal device group 100 illustrated in FIG. 1 that is arranged in a factory for manufacturing the abnormality-suspected product.

Hereinafter, operation of the quality control system 400 is described with reference to FIG. 5.

Figure 5:
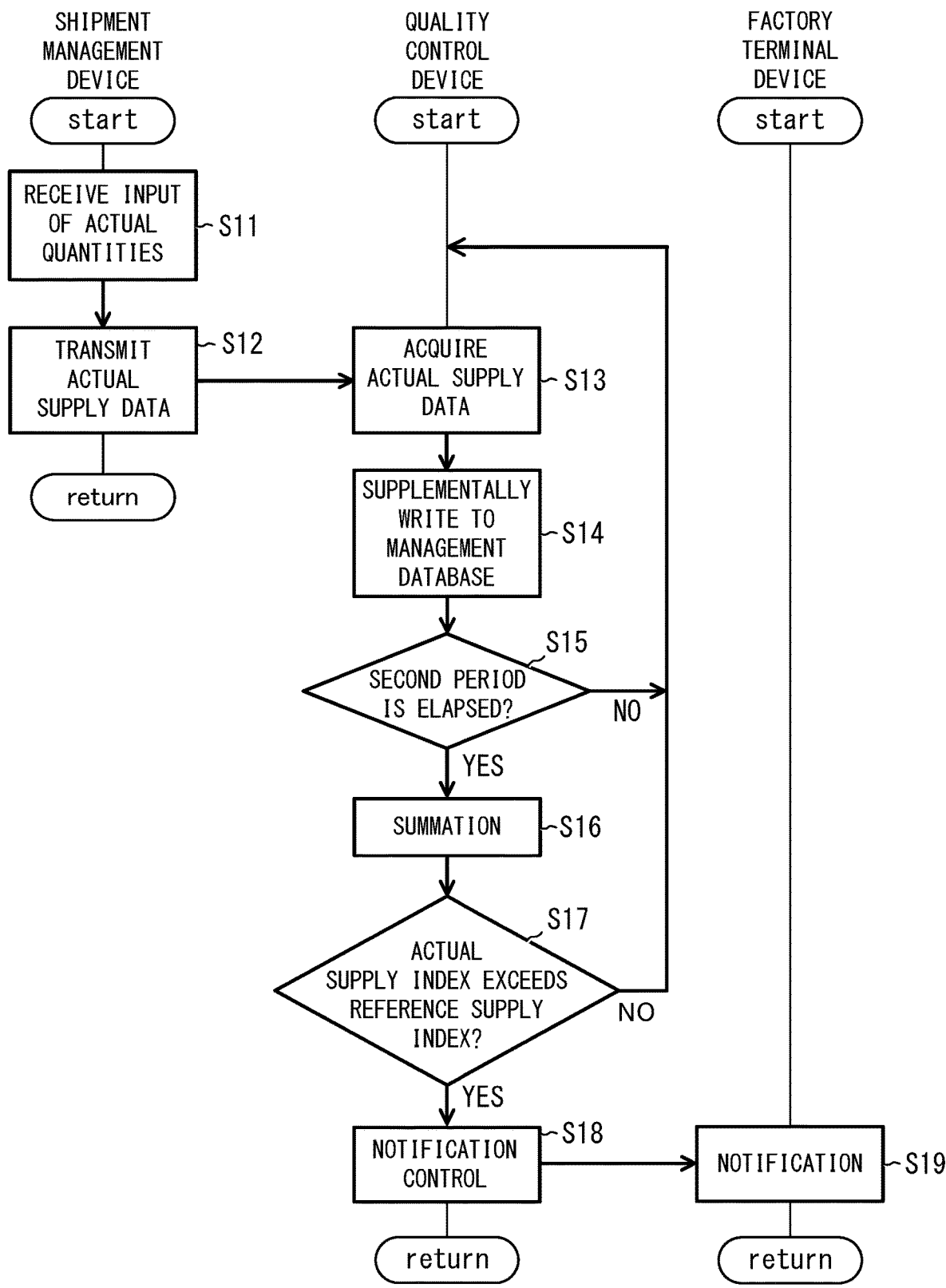
FIG. 5 is a flowchart of an operation of the quality control system according to Embodiment 1.

First, as illustrated in FIG. 5, the shipment management device 200 receives, from a user of the shipment department, input of the actual quantities that each are a shipment quantity of the multiple types of replaceable members for one day (step S11). The shipment management device 200, in response to the input of the actual quantities into the shipment management device 200, transmits to the quality control device 300 the actual supply data DA in which the respective replaceable member ID and the actual quantity for the replaceable member represented by the replaceable member ID that is inputted in step S11 are associated (step S12).

Then, in the quality control device 300, the actual supply data acquirer 331 illustrated in FIG. 4 acquires the actual supply data DA from the shipment management device 200 (step S13) and performs supplemental writing to the management database 322 based on the acquired actual supply data DA (step S14).

Specifically, the actual supply data acquirer 331, every time the actual supply data DA is acquired, that is, day by day, supplementally writes a new date to the item 322b in the management database 322 illustrated in FIG. 3 and supplementally writes to the item 322c the actual quantities associated in the actual supply data DA with the replaceable member IDs.

Then, in the quality control device 300, the calculator 332 illustrated in FIG. 4 determines whether the second period (specifically, one month) is elapsed that is predetermined as a period for repeatedly determining whether the excessive demand situation occurs for the replaceable members (step S15). In the case where one month is not yet elapsed (NO in step S15), the processing returns to step S13.

Conversely, in the case where one month is elapsed (YES in step S15), the calculator 332 calculates, for each of the replaceable member IDs, the actual supply index by performing summation of actual quantities accumulated in the management database 322 illustrated in FIG. 3 for one month (step S16).

Then, in the quality control device 300, the determiner 333 illustrated in FIG. 4 determines for each of the multiple types of replaceable members whether the actual supply index of the replaceable member calculated by the calculator 332 exceeds the reference supply index that is a forecasted value for a shipment quantity within one month represented by the threshold value data 321 (step S17). This step S17 is an example of a determination process of determining whether the excess demand situation occurs for a replaceable member. In the case where the actual supply indexes are smaller than or equal to the reference supply indexes (NO in step S17), then the processing returns to step S13 since no excess demand situation occurs.

Conversely, in a case where an actual supply index among the actual supply indexes exceeds a corresponding reference supply index (YES in step S17), the excess demand situation can be said to occur, and thus, the notification controller 334 illustrated in FIG. 4 refers to the management database 322 illustrated in FIG. 3 and specifies a factory ID corresponding to a replaceable member ID of a replaceable member for which the determination is made by the determiner 333 that the excess demand situation occurs.

Then the notification controller 334 performs the notification control for causing a factory terminal device 110 that is included in the factory terminal device group 100 illustrated in FIG. 1 and is identified by the factory ID to send notification indicating a possibility that an abnormality is occurring in quality of a product (step S18).

Then the factory terminal device 110 receives the notification control by the quality control device 300 and sends notification indicating a possibility that an abnormality is occurring in quality of the abnormality-suspected product (step S19). This causes grasping, in the factory in which the factory terminal device 110 is arranged, of the possibility that an abnormality is occurring for the quality of the abnormality-suspected product. Thus, a quality inspection process of inspecting the quality of the abnormality-suspected product is performed in the factory, and in the case where a result of the inspection for the quality shows that the abnormality-suspected product has a problem in quality thereof, improvement in the quality of the abnormality-suspected product starts.

As described above, according to the present embodiment, detection of a possibility that an abnormality is occurring in the quality of the product can be achieved upon determination by the determiner 333 that the excess demand situation occurs for the replaceable member. Since the heretofore-required checking of symptoms of trouble reported by a user can be omitted, in comparison to conventional techniques, earlier grasping of a possibility that an abnormality is occurring in the quality of the abnormality-suspected product can be achieved by notification control by the notification controller 334 and the notification by the factory terminal device 110.

Embodiment 2

In aforementioned Embodiment 1, the reference supply indexes represented by the threshold value data 321 illustrated in FIG. 2 are each determined independently of a shipment quantity or sold quantity of a corresponding product. However, each reference supply index may be determined by a cumulative value of shipment quantities or sold quantities of a corresponding product. Further, although the calculator 332 illustrated in FIG. 4 performs the operation of summing the reference supply indexes in aforementioned Embodiment 1, the calculator 332 may perform an operation other than addition. Hereinafter, a specific example of such configuration is described.

As illustrated in FIG. 6, in the present embodiment, each of reference supply indexes corresponding to the multiple types of replaceable members is, in the threshold value data 321, determined by a cumulative value of shipment quantities of the product provided with the replaceable member. Further, different units of physical quantities are used for the reference supply index, according to the cumulative value of shipment quantities of the product.

Specifically, in the case where the cumulative value of shipment quantities of a product is less than a boundary value 1,000, a unit used for the reference supply index is "[count]", similarly to Embodiment 1.

Conversely, in the case where the cumulative value of shipment quantities of a product is more than or equal to 1,000, the unit used for the reference supply index is "[%]". This reference supply index with the unit "%" represents a shipment rate that is obtained by dividing shipment quantity of a replaceable member by a cumulative value of shipment quantities of a product provided with the replaceable member.

The boundary value that serves as a reference, according to which the reference supply index has different definitions, represents a boundary between an early-failures period and a random-failures period in a bathtub curve representing changes in an average failure rate of the multiple types of products. Although the boundary value is taken to be 1,000 in the present embodiment, the boundary value is not particularly limited to 1,000.

Hereinafter, operation of a quality control device 300 according to the present embodiment is described with reference to FIG. 7. The present embodiment further includes, between steps S16 and S17 illustrated in FIG. 5, steps S21 to S25 illustrated in FIG. 7.

Figure 7:
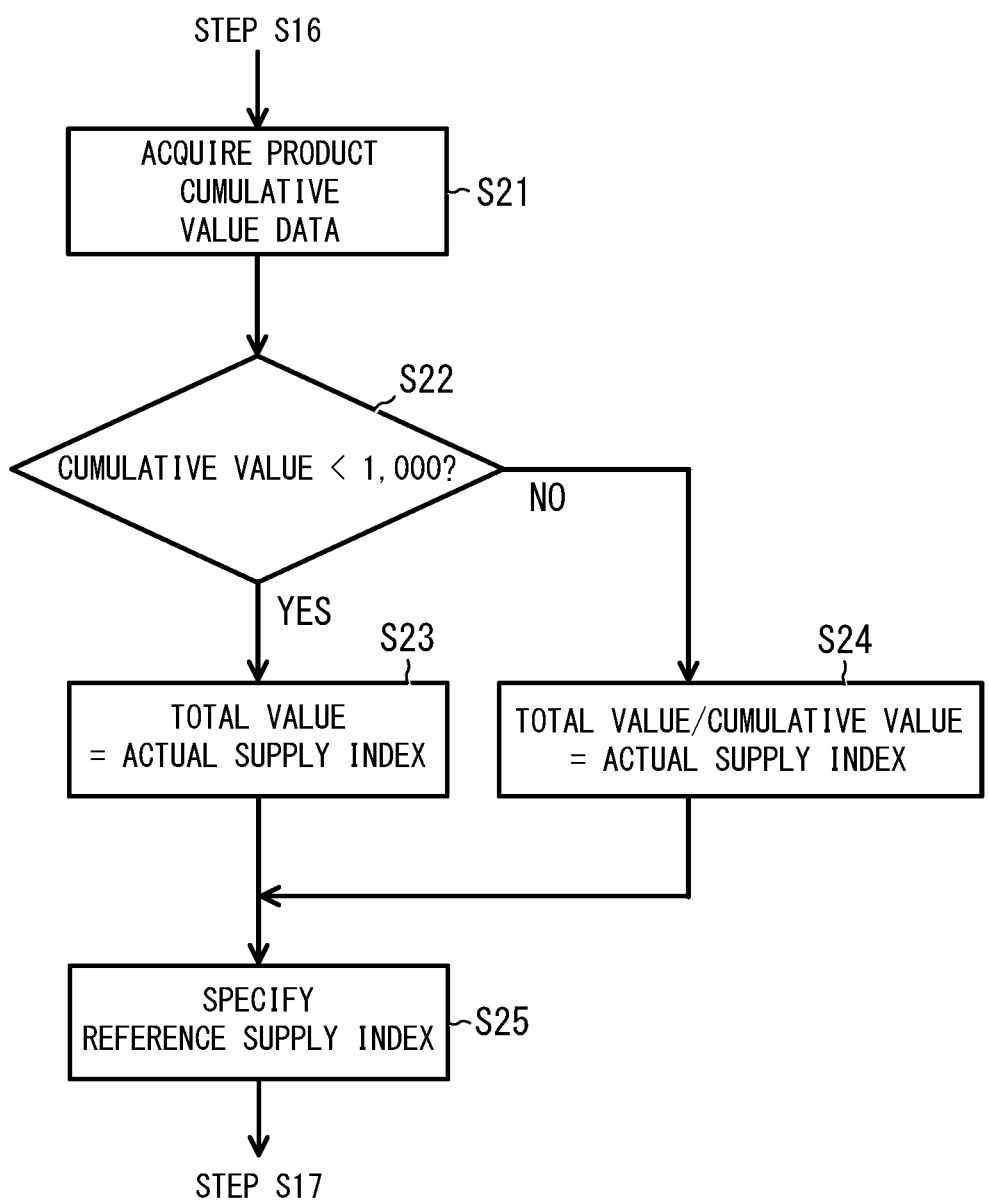
FIG. 7 is a flowchart of a part of an operation of a quality control device according to Embodiment 2.

As illustrated in FIG. 7, after step S16, the actual supply data acquirer 331 illustrated in FIG. 4 makes a request for the shipment management device 200 illustrated in FIG. 1 to transmit product cumulative value data representing for each of the multiple types of products a cumulative value of shipment quantities and acquires the product cumulative value data from the shipment management device 200 (step S21).

Specifically, the product cumulative value data is data in which each of the product IDs and a cumulative value of shipment quantities of a product represented by the product ID are associated. Thus, in the present embodiment, the actual supply data acquirer 331 illustrated in FIG. 4 doubles as product-cumulative-value data acquisition means for acquiring the product cumulative value data.

Then the calculator 332 illustrated in FIG. 4 determines for each of the multiple types of products whether the cumulative value of the shipment quantities represented by the product cumulative value data acquired in step S21 is less than 1,000, in order to specify a method for calculation of the actual supply index of the product according to the cumulative value of the shipment quantities of the product (step S22).

In the case where the cumulative value of the shipment quantities of the product is less than 1,000 (YES in step S22), the unit of the reference supply index is "[count]". Thus, the calculator 332 employs as the actual supply index a total value that is a value obtained by summing in step S16 of FIG. 5 the actual quantities, in order to obtain the actual supply index with a physical quantity identical to that of the reference supply index (step S23).

Conversely, in the case where the cumulative value of the shipment quantities of a product is more than or equal to 1,000 (NO in step S22), the unit of the reference supply index is "%". Thus, the calculator 332 employs as the actual supply index a shipment rate that is obtained by dividing the total value obtained in step S16 of FIG. 5 by the cumulative value of the shipment quantities represented by the product cumulative value data acquired in step S21, in order to obtain the actual supply index with a physical quantity identical to that of the reference supply index (step S24).

Then, after step S23 or step S24, the determiner 333 illustrated in FIG. 4, by acquiring from the actual supply data acquirer 331 the product cumulative value data described above and referring to the threshold value data 321 illustrated in FIG. 6, specifies a reference supply index corresponding to the cumulative value represented by the product cumulative value data (step S25).

Then the processing shifts to step S17 illustrated in FIG. 5. In step S17, the determiner 333 compares the reference supply index specified in step S25 with the actual supply index obtained by the calculator 332 in step S23 or step S24. Then, similarly to Embodiment 1, in the case where the actual supply index exceeds the reference supply index, a determination is made that the excess demand situation occurs.

As described above, according to the present embodiment, a reference supply index serving as a reference for determination of whether an abnormality is occurring in a product is determined by a cumulative value of shipment quantities of the product. That is to say, strictness of the determination on whether there is a probability that an abnormality is occurring in a product can be changed according to the cumulative value of shipment quantities of the product. This enables, in comparison to Embodiment 1, more accurate detection of the possibility that the abnormality is occurring in the product.

Embodiment 3

Although aforementioned Embodiment 1 describes an example case in which the replaceable member IDs and the product IDs have one-to-one correspondence, multiple types of products having different product IDs may be provided with the same replaceable member. Hereinafter, multiple types of products provided with the same replaceable member are each termed a relevant product. That is to say, the concept of "a product provided with a replaceable member" may also include multiple types of relevant products having different product IDs. Hereinafter, a specific example of such configuration is described.

In the present embodiment, the shipment management device 200 illustrated in FIG. 1 can track, for each replaceable member, a relevant product that is included a group of relevant products provided with the same replaceable member and for which the replaceable member is shipped for replacement of the replaceable member with which the relevant product is provided.

Thus, the actual supply data DA outputted by the shipment management device 200 represents, for each replaceable member, multiple actual quantities for the relevant products that represent, as described above, a shipment quantity of the replaceable member. The quality control device 300 illustrated in FIG. 1 accumulates this actual supply data DA in the management database 322 and manages histories of the shipment quantities of the replaceable members. Hereinafter, configuration of a management database 322 according to the present embodiment is specifically described.

As illustrated in FIG. 8, the management database 322 according to the present embodiment contains an item 322f for storing, for each replaceable member ID, product IDs corresponding to multiple relevant products that are provided with the same replaceable member represented by the replaceable member ID.

Additionally, the management database 322 contains an item 322e for storing, for each replaceable member ID, a factory ID identifying a factory for manufacturing (i) a replaceable member represented by the replaceable member ID and (ii) relevant products that are provided with the same replaceable member.

The example illustrated in FIG. 8 indicates that the product corresponding to a product ID "xxxx", the product corresponding to a product ID "yyyy", and the product corresponding to a product ID "zzzz" are relevant products provided with the same replaceable member corresponding to a replaceable member ID "abc" and that these relevant products and the replaceable member are manufactured in a common factory identified by a factory ID "jp01".

Additionally, the management database 322 contains an item 322b for storing, for each product ID of the product IDs corresponding to the relevant products, a shipping date on which the replaceable member is shipped, and an item 322c for storing, for each product ID of the product IDs corresponding to the relevant products, the actual quantity for the replaceable member.

The actual supply data acquirer 331, upon every acquisition of the actual supply data DA from the shipment management device 200 in step S14 of FIG. 5, based on the actual supply data DA, performs, for each product ID of the product IDs corresponding to the relevant products, supplemental writing to the item 322b for storing a shipping date of a replaceable member and the item 322c for storing an actual quantity of the replaceable member.

In step S16 of FIG. 5, the calculator 332 calculates, for each product ID of the product IDs corresponding to the relevant products, the actual supply index by performing, for each product ID of the product IDs corresponding to the relevant products, summation of actual quantities for one month. In step S17 of FIG. 5, the determiner 333 determines for each of the relevant products whether the excess demand situation occurs, by comparing the actual supply indexes that each are calculated for a product ID corresponding to the relevant product with a corresponding reference supply index.

In step S18 of FIG. 5, the notification controller 334 performs the notification control for a relevant product among the multiple relevant products for which a determination is made by the determiner 333 that the excess demand situation occurs (such a relevant product being hereinafter referred to as an "abnormality-suspected relevant product"). That is to say, the notification controller 334 causes a factory terminal device 110 to send notification indicating a possibility that an abnormality is occurring in quality of the abnormality-suspected relevant product.

Further, in step S18 of FIG. 5, the notification controller 334 performs display control to cause display of an actual result of shipment of the replaceable member, not only for the abnormality-suspected product, but also for all the relevant products including a relevant product that is included in the multiple relevant products and for which a determination is made by the determiner 333 that the excess demand situation occurs (such a relevant product is hereinafter referred to as a "non-abnormality-suspected relevant product").

Specifically, the notification controller 334, in performing the display control, extracts from the management database 322 relevant product actual data representing a history of the actual supply indexes for all the relevant products in the past that are calculated by the calculator 332, transmits the relevant product actual data to the factory terminal device 110, and causes the factory terminal device 110 to display the relevant product actual data using a graph.

Figure 9:
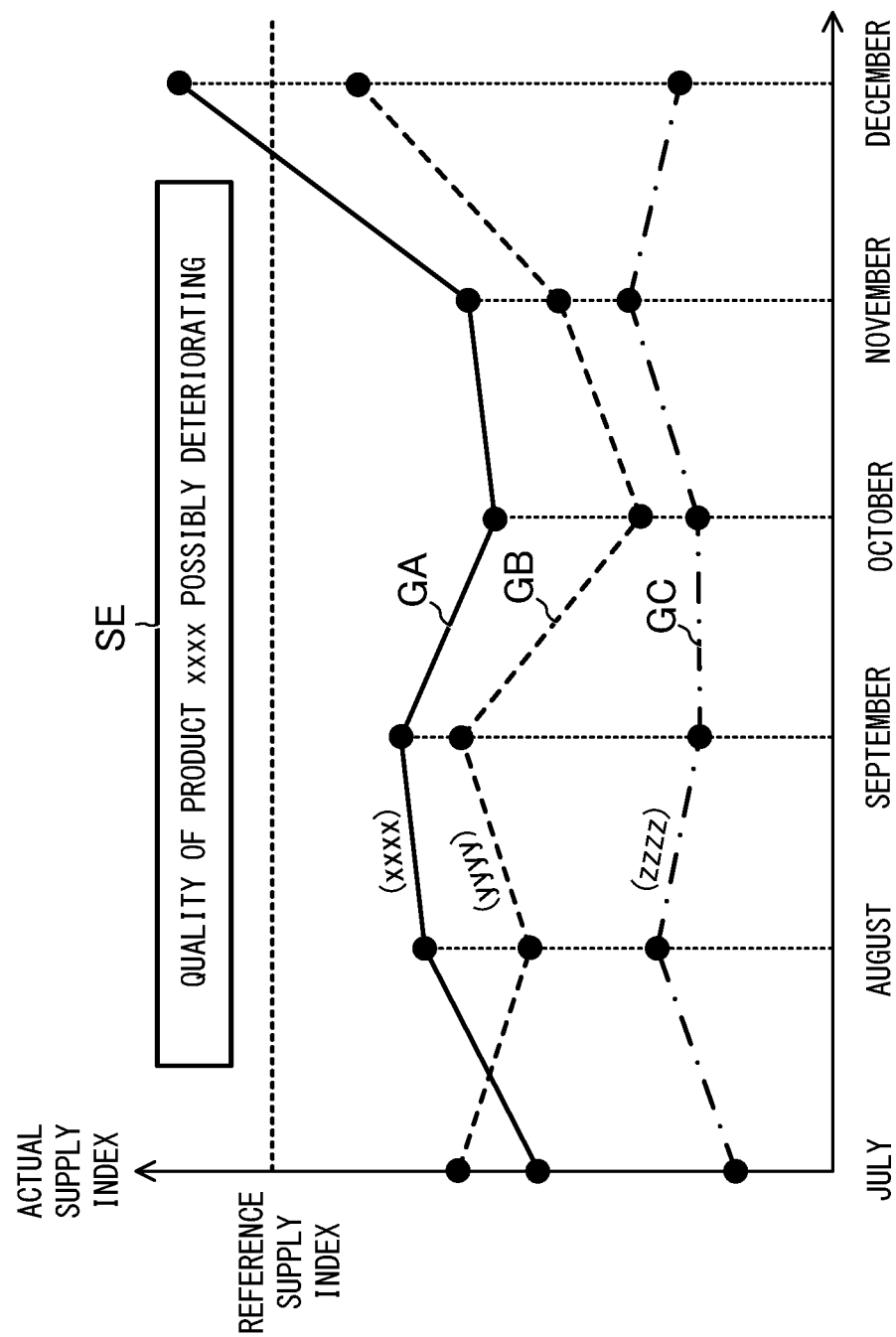
FIG. 9 is a schematic diagram illustrating content displayed by a factory terminal device according to Embodiment 3.

FIG. 9 illustrates contents displayed on a display screen of the factory terminal device 110 in response to the notification control and the display control from the notification controller 334. The content displayed in a column SE indicates a possibility that an abnormality is occurring in quality of the product that is the abnormality-suspected relevant product and corresponds to the product ID "xxxx". The column SE is displayed by the notification control described above.

Line graphs GA, GB, and GC are displayed by the display control described above. The line graph GA shows an actual supply index for the relevant product corresponding to the product ID "xxxx", the line graph GB shows an actual supply index for the relevant product corresponding to the product ID "yyyy", and the line graph GC shows an actual supply index for the relevant product corresponding to the product ID "zzzz".

As described above, according to the present embodiment, in addition to the notification control for an abnormality-suspected product, an actual supply index for a non-abnormality-suspected relevant product is displayed using a graph. This allows a user to, not only grasp a possibility that the abnormality is occurring in the quality of the abnormality-suspected product, but also visually grasp whether the non-abnormality-suspected relevant product has an abnormal trend.

Specifically, the line graph GB illustrated in FIG. 9 does not exceed the reference supply index but changes similarly to the line graph GA, and thus the non-abnormality-suspected relevant product corresponding to the product ID "yyyy" can be understood to have an abnormal trend and is likely to be a target of the notification control in the future, similarly to the abnormality-suspected product corresponding to the product ID "xxxx". This enables the start of improvement in the quality of the non-abnormality-suspected relevant product corresponding to the product ID "yyyy".

Embodiment 4

In aforementioned Embodiment 3, the shipment management device 200 illustrated in FIG. 1 can track for which relevant product a replaceable member is shipped, that is, can track for which relevant product the replace member is shipped for replacement of the replaceable member thereof. However, such tracking is not necessarily enabled. Hereinafter, a specific example of such configuration is described.

In a management database 322 according to the present embodiment, as illustrated in FIG. 10, although a correspondence relationship between a replaceable member and a group of relevant products provided with the same replaceable member is obtained, a correspondence relationship between (i) product IDs stored in the item 322f and corresponding to multiple relevant products and (ii) shipment dates and actual quantities of the replaceable member is not obtained.

Due to this, in step S17 of FIG. 5, the determiner 333 cannot determine for each relevant product whether the excess demand situation occurs, although determination is possible for each replaceable member as to whether the excess demand situation occurs.

Thus, in step S18 of FIG. 5, the notification controller 334, as notification control, causes the factory terminal device 110 to display that there is a possibility that an abnormality is occurring in quality of any relevant product. For example, the notification controller 334 causes the factory terminal device 110 to display that "deterioration in quality may possibly occur in one of the product xxxx, the product yyyy, and the product zzzz.

This enables (i) performance in a factory in which the factory terminal device 110 is arranged of a quality inspection process of inspecting, for each of the relevant products corresponding to the product IDs "xxxx", "yyyy" and "zzzz", the quality of the relevant product and (ii) the start of improvement in the quality of a relevant product determined to have abnormality.

Embodiment 5

In aforementioned Embodiment 1, a shipment quantity of a replaceable member is used as the actual supply index for determination of whether the excess demand situation occurs for the replaceable member. However, a rate of change of such shipment quantity may be used as the actual supply index. Similarly, a rate of change of a forecasted shipment quantity of the replaceable member may be used as the reference supply index. Hereinafter, a specific example of such configuration is described.

In the present embodiment, in step S16 of FIG. 5, the calculator 332, after obtaining a total value by summing actual quantities of a replaceable member, calculates a difference between the total value and a previous total value. Then, a value of the difference is taken to be the actual supply index to be used for determination in step S17 of FIG. 5. Specifically, this "previous total value" means, in the case of obtaining an actual supply index for one month, a total value of actual quantities for a month preceding the one month.

Further, in the present embodiment, the threshold value data 321 illustrated in FIG. 2 represents, as a forecasted value corresponding to the actual supply index described above, a reference supply index that is a rate of change in a forecasted shipment quantity of the replaceable member. This reference supply index is used as a reference for determination in step S17 of FIG. 5.

In the present embodiment, in step S17 of FIG. 5, the determiner 333 determines whether a rate of change in the total value of the actual quantities is exceeding the reference supply index. The rate of change in the total value of the actual quantities represents tendency of changing in demand for the replaceable member, and thus the determiner 333 can determine whether an indication leading to the excess demand situation for the replaceable member occurs. This enables, in comparison to Embodiment 1, earlier grasping of the possibility that an abnormality is occurring in the quality of the product or in the quality of a replaceable member with which the product is provided.

While Embodiments 1-5 according to the present disclosure are described above, the present disclosure is not limited to the aforementioned embodiments, and modifications as described below may be made.

In aforementioned Embodiments 1-5, the actual supply index indicates a shipment quantity of a replaceable member or a rate of change in the quantity. However, the actual supply index may be an actual value that is correlated with a shipment quantity of a replaceable member or with a rate of change in the quantity. For example, the actual supply index may indicate a sales quantity or a rate of change in the sales quantity, an orders quantity or a rate of change in the orders quantity, or a stock quantity or a rate of change in the stock quantity. The sales quantity and the orders quantity each have a positive correlation with a shipment quantity, whereas the stock quantity has a negative correlation with the shipment quantity of the replaceable member.

In aforementioned Embodiment 1, in the case where the excess demand situation occurs for a replaceable member, the notification controller 334 performs notification control for causing a factory terminal device 110 to send notification indicating a possibility that an abnormality is occurring in the quality of the product. In the case of occurrence of the excess demand situation for a replaceable member, an abnormality may possibly occur in the quality of the replaceable member. This is because the occurrence of the abnormality in the quality of the replaceable member leads to a short life of the replaceable member. Thus, the notification controller 334 may, as the notification control, causes the factory terminal device 110 to send notification indicating a possibility that an abnormality is occurring in the quality of the replaceable member.

Although aforementioned Embodiment 1 describes an example case in which a factory for manufacturing a replaceable member is identical to a factory for manufacturing a product provided with the replaceable member, the factory for manufacturing the replaceable member and the factory for manufacturing the product provided with the replaceable member may be different. In this case, the notification controller 334 may perform notification control with respect to a factory terminal device 110 arranged in the factory for manufacturing the product, may perform notification control with respect to a factory terminal device 110 arranged in the factory for manufacturing the replaceable member, or may perform notification control with respect to both of these factory terminal devices 110.

In aforementioned Embodiment 1, the factory terminal device 110 arranged in a factory for manufacturing a product and a replaceable member serves as the notification device that receives notification control. However, an installation location of the notification device is not particularly limited to the factory. A terminal device arranged in a department for performing design, development, or inspection of the product or of the replaceable member may serve as the notification device that receives notification control.

In aforementioned Embodiments 1-5, no particular limitation is placed on the combination of the product and the replaceable member with which the product is provided. The combination of the product and the replaceable member may be a combination of an electrical device and a sensor, an electrical device and a motor, an electrical device and a control circuit that controls the electrical device, an electrical device and a power circuit that controls power supply to the electrical device, a refrigerator or an air conditioner and a member that provides a refrigeration cycle together with the refrigerator or the air conditioner, a cleaner or an air cleaner and a filter, a printer and an ink cartridge, an optical drive and a lasing device, or a lightning equipment and a luminescent device.

Installing in a computer the quality control program 323 illustrated in FIG. 1 enables the computer to function as the quality control device 300. The quality control program 323 may be distributed via a communication line or by distribution of the quality control program 323 stored on a computer-readable recording medium such as an optical disk, a magnetic disk, a magnet-optical disk, and a flash memory.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2018-247384, filed on Dec. 28, 2018, the entire disclosure of which is incorporated by reference herein.

INDUSTRIAL APPLICABILITY

A quality control device, a quality control system, a quality control method, and a quality control program according to the present disclosure can be used for controlling quality of a product or a replaceable member with which the product is provided.

REFERENCE SIGNS LIST

100 Factory terminal device group
110 Factory terminal device (Notification device)
200 Shipment management device (Actual supply data provision device)
300 Quality control device
310 Communicator
320 Auxiliary storage (Storage means, Accumulation means)
321 Threshold value data
322 Management database
322*a*-322*f* Item
323 Quality control program
330 CPU
331 Actual supply data acquirer (Actual supply data acquisition means, Product accumulated data acquisition means)
332 Calculator (Calculation means)
333 Determiner (Determination means)
334 Notification controller (Notification control means)
340 Main storage
400 Quality control system
NE Communication line
DA Actual supply data
SE Column
GA-GC Line graph

The invention claimed is:

1. A quality control device comprising:
an actual supply data acquirer to acquire, for a replaceable member with which a product is replaceably provided, actual supply data representing an actual result of shipment, sales, or orders for replacement of the replaceable member in the product that is already sold and used;
a determiner to determine whether an excess demand situation occurs in which demand for the replaceable member exceeds predetermined forecasted demand by:
comparing a cumulative value of shipment quantities of the product with a boundary threshold value;
in response to determining that the cumulative value of shipment quantities of the product is less than the boundary threshold value, specifying an actual supply index based on a total quantity of the replaceable member shipped, sold, or ordered using the actual supply data;
in response to determining that the cumulative value of shipment quantities of the product is not less than the boundary threshold value, specifying the actual supply index based on a shipment rate of the replaceable member using the actual supply data; and
comparing the actual supply index to a reference supply index specific to the replaceable member; and
a notification controller to, when the determiner determines that the excess demand situation occurs, perform notification control to cause sending of notification indicating a possibility that an abnormality is occurring in quality of the product or the replaceable member.

2. The quality control device according to claim 1, wherein
the actual supply data includes an actual quantity that is a quantity of the replaceable member shipped, sold, or ordered over a predetermined first period, and the quality control device further comprises:
an accumulator to accumulate, in response to every acquisition of the actual supply data by the actual supply data acquirer, the actual quantity included in the actual supply data; and
a calculator to calculate the actual supply index by using a plurality of the actual quantities accumulated in the accumulator for a second period that is previously occurring and longer than the first period.

3. The quality control device according to claim 1, wherein
the product is a plurality of relevant products of different models,
the actual supply data represents, for each of the plurality of relevant products, an actual result of shipment, sales, or orders for the replacement of the replaceable member,
the determiner, using the actual supply data, determines for each of the plurality of relevant products whether the excess demand situation or an indication leading to the excess demand situation occurs, and
the notification controller (i) performs the notification control for a relevant product of the relevant products for which a determination is made by the determiner that the excess demand situation or the indication leading to the excess demand situation occurs and (ii) performs display control to cause display of, for a relevant product of the relevant products for which the determination is not made, an actual result of shipment, sales, or orders of the replaceable member for the replacement.

4. A quality control system comprising:
the quality control device according to claim 1;
an actual supply data provision device to provide the actual supply data acquirer with the actual supply data; and
a notification device to, upon receiving the notification control by the notification controller, send notification indicating a possibility that an abnormality is occurring in the quality of the product or the replaceable member.

5. A quality control method comprising:
storing, by a storage device, program code for determining, for a replaceable member with which a product is replaceably provided, based on an actual result of shipment, sales, or orders for replacement of the replaceable member in the product that is already sold and used, whether an excess demand situation occurs in which demand for the replaceable member exceeds predetermined forecasted demand, wherein the product is a plurality of relevant products of different models and the actual supply data includes information representative of each of the plurality of relevant products;
executing, by a processing device, the program code which causes the processing device to perform operations including:
(a) receiving, by a processor of the processing device from an external device, actual supply data associated with the replaceable member, the actual supply data representing an actual result of shipment, sales, or orders for replacement of the replaceable member associated with at least one relevant product of the plurality of relevant products in the product that is already sold and used;
(b) comparing, by the processor, a cumulative value of shipment quantities of the at least one relevant product of the plurality of relevant products extracted from the actual supply data with a boundary threshold value;
(c) in response to determining that the cumulative value of shipment quantities of the product is less than the boundary threshold value, specifying, by the processor, an actual supply index based on a total quantity of the replaceable associated with the at least one relevant product of the plurality of relevant products member shipped, sold, or ordered using the actual supply data;
(d) in response to determining that the cumulative value of shipment quantities of the product is not less than the boundary threshold value, specifying, by the processor, the actual supply index based on a shipment rate of the replaceable member associated with the at least one relevant product of the plurality of relevant products using the actual supply data;
(e) comparing, by the processor, the actual supply index to a reference supply index specific to the replaceable member associated with the at least one relevant product of the plurality of relevant products;
(f) generating, by the processor, plural output signals based on the comparison; and
(g) sending, by a communicator of the processing device, one of the plural output signals to a remote device, wherein when performance of steps (a) to (e) indicates that the excess demand situation occurs, the one output signal of the plural output signals causing the remote device to perform a quality inspection of the at least one relevant product of the plurality of relevant products.

6. A non-transitory computer-readable recording medium storing a quality control program, which when executed by a processing device, causes the processing device to perform an operation comprising:
receiving actual supply data from a storage device, the actual supply data being associated with a replaceable member with which a product is replaceably provided, and the actual supply data representing an actual result of shipment, sales, or orders for replacement of the replaceable member in the product that is already sold and used, wherein the product is a plurality of relevant products of different models and the actual supply data includes information representative of each of the plurality of relevant products;
processing the actual supply data to determine whether an excess demand situation occurs in which demand for the replaceable member associated with the at least one relevant product of the plurality of relevant products exceeds predetermined forecasted demand, the processing operation including:
(a) comparing, by a processor of the processing device, a cumulative value of shipment quantities of the product extracted from the actual supply data with a boundary threshold value;
(b) in response to determining that the cumulative value of shipment quantities of the product is less than the boundary threshold value, specifying, by the processor, an actual supply index based on a total quantity of the replaceable member shipped, sold, or ordered using the actual supply data;
(c) in response to determining that the cumulative value of shipment quantities of the product is not less than the boundary threshold value, specifying, by the processor, the actual supply index based on a shipment rate of the replaceable member using the actual supply data; and (d) comparing, by the processor, the actual supply index to a reference supply index specific to the replaceable member;

(e) generating, by the processor, at least one notification when performing steps (a) to (e) indicates that the excess demand situation occurs; and (f) sending, by a communicator of the processing device, the at least one notification to a remote device, the at least one notification indicating a possibility that an abnormality is occurring in quality of a relevant product of the plural relevant products or the replaceable member, the at least one notification causing the remote device to perform a quality inspection of a relevant product of the plural relevant products.

\* \* \* \* \*